(12) United States Patent
Schmidt et al.

(10) Patent No.: US 11,841,037 B2
(45) Date of Patent: *Dec. 12, 2023

(54) FLEXIBLE FLUID FLOW MODIFYING DEVICE

(71) Applicant: Vortex Pipe Systems LLC, Austin, TX (US)

(72) Inventors: Paul Wayne Schmidt, Carlton, OR (US); Avijit Ghosh, Austin, TX (US)

(73) Assignee: Vortex Pipe Systems, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,445

(22) Filed: Feb. 24, 2023

(65) Prior Publication Data
US 2023/0220858 A1    Jul. 13, 2023

Related U.S. Application Data

(63) Continuation of application No. 17/832,625, filed on Jun. 4, 2022, now Pat. No. 11,619,247, which is a continuation of application No. 17/569,365, filed on Jan. 5, 2022, now Pat. No. 11,378,110.

(51) Int. Cl.
*F15D 1/06* (2006.01)

(52) U.S. Cl.
CPC ................... *F15D 1/06* (2013.01)

(58) Field of Classification Search
CPC ..... F16D 1/06; B01F 25/4314; B01F 25/4331
USPC .............. 138/37–39, 121, 122, 118; 366/339
See application file for complete search history.

(56) References Cited

U.S. PATENT DOCUMENTS

| | | | | |
|---|---|---|---|---|
| 1,496,345 A | * | 6/1924 | Lichtenthaeler | B01F 25/3131 366/147 |
| 1,500,103 A | * | 7/1924 | Murray | F23C 99/00 48/189.4 |
| 1,513,624 A | * | 10/1924 | Parker | B05B 7/04 239/404 |
| 1,777,141 A | * | 9/1930 | Hay | F02M 69/00 239/404 |
| 1,959,907 A | * | 5/1934 | Ebert | F02M 17/44 261/41.2 |
| 1,974,110 A | * | 9/1934 | Higley | F15D 1/04 138/39 |
| 2,274,599 A | * | 2/1942 | Freeman | F01N 1/12 181/255 |
| 2,300,130 A | * | 10/1942 | McCurdy | F01N 1/12 181/274 |

(Continued)

*Primary Examiner* — Patrick F Brinson
(74) *Attorney, Agent, or Firm* — David O. Simmons; IVC Patent Agency

(57) ABSTRACT

Disclosed fluid flow modifying devices are useful with flexible fluid flow conduits. Such devices are adapted for mitigating adverse flow considerations arising from one or more bends in flexible fluid flow conduits. These adverse flow considerations are generally characterized as enhanced laminar flow and associated increased backpressure arising from reduced flow velocity caused by the one or more bends. Beneficially, disclosed fluid flow modifying devices cause flow of flowable material (e.g., a liquid) within a flow passage of a fluid flow conduit to have a rotational flow profile. Such a rotational flow profile advantageously reduces frictional losses associated with laminar flow and with directional change of fluid flow.

28 Claims, 4 Drawing Sheets

(56) References Cited

U.S. PATENT DOCUMENTS

| | | | | |
|---|---|---|---|---|
| 2,784,948 A * | 3/1957 | Pahl | B01F 25/3131 | 366/178.2 |
| 2,816,518 A * | 12/1957 | Daggett | B01F 25/4314 | 137/896 |
| 2,831,754 A * | 4/1958 | Manka | B01D 11/0473 | 239/404 |
| 4,154,296 A * | 5/1979 | Fijas | F28F 1/32 | 165/184 |
| 4,204,775 A * | 5/1980 | Speer | B01F 25/4521 | 366/336 |
| 4,248,179 A * | 2/1981 | Bonner | F28F 1/40 | 165/184 |
| 4,339,918 A * | 7/1982 | Michikawa | F01N 13/082 | 181/279 |
| 4,474,726 A * | 10/1984 | Ohta | B29C 57/02 | 264/516 |
| 4,874,249 A * | 10/1989 | Kabatek | B01F 25/4314 | 366/339 |
| 4,995,450 A * | 2/1991 | Geppelt | F24T 10/40 | 165/184 |
| 5,423,353 A * | 6/1995 | Sorensen | F16L 39/02 | 138/119 |
| 5,727,598 A * | 3/1998 | Stuhlreyer | F16L 9/16 | 138/148 |
| 5,743,637 A * | 4/1998 | Ogier | B01F 23/50 | 138/44 |
| 5,765,598 A * | 6/1998 | Goddard | F16L 9/12 | 138/116 |
| 5,909,959 A * | 6/1999 | Gerich | B01F 25/433 | 222/459 |
| 5,922,465 A * | 7/1999 | Gailberger | C09B 67/0097 | 428/407 |
| 6,564,831 B1 * | 5/2003 | Sanoner | B29C 48/11 | 138/DIG. 11 |
| 7,114,524 B2 * | 10/2006 | Houston | F16L 11/121 | 285/132.1 |
| 7,849,885 B2 * | 12/2010 | Olsen | F16L 11/22 | 138/116 |
| 8,033,714 B2 * | 10/2011 | Nishioka | B01D 53/8631 | 366/337 |
| 8,110,267 B2 * | 2/2012 | Houston | A61F 2/86 | 604/93.01 |
| 8,955,553 B2 * | 2/2015 | Sheldrake | F16L 11/133 | 138/144 |
| 9,982,693 B2 * | 5/2018 | Nord | F16L 55/02772 | |
| 10,092,886 B2 * | 10/2018 | Kashihara | F28D 21/001 | |
| 10,201,786 B2 * | 2/2019 | Okada | B01F 25/433 | |
| 2008/0308169 A1 * | 12/2008 | Nielsen | B29C 45/14467 | 138/116 |
| 2010/0307830 A1 * | 12/2010 | Curlett | E21B 7/18 | 175/380 |
| 2012/0285173 A1 * | 11/2012 | Poyyapakkam | F23C 7/004 | 60/748 |
| 2016/0270893 A1 * | 9/2016 | Tapocik | B05C 17/0103 | |
| 2017/0306994 A1 * | 10/2017 | Schmidt | F16L 55/02772 | |
| 2020/0173466 A1 * | 6/2020 | Bhongade | H01R 13/622 | |
| 2020/0263712 A1 * | 8/2020 | Schmidt | B01F 25/435 | |
| 2020/0370572 A1 * | 11/2020 | Schmidt | B01F 25/4314 | |
| 2020/0370573 A1 * | 11/2020 | Schmidt | F16L 57/06 | |

* cited by examiner

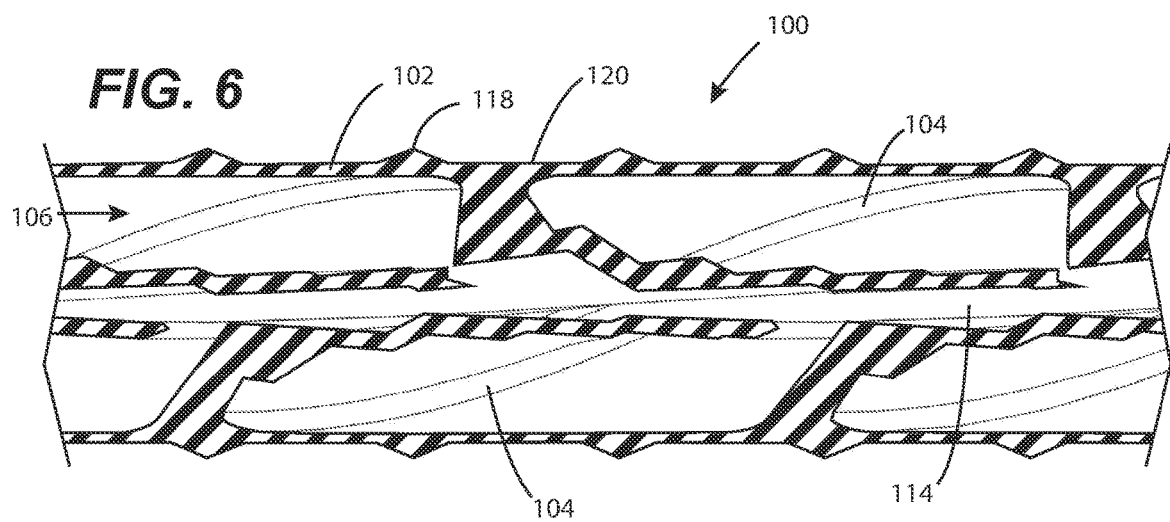
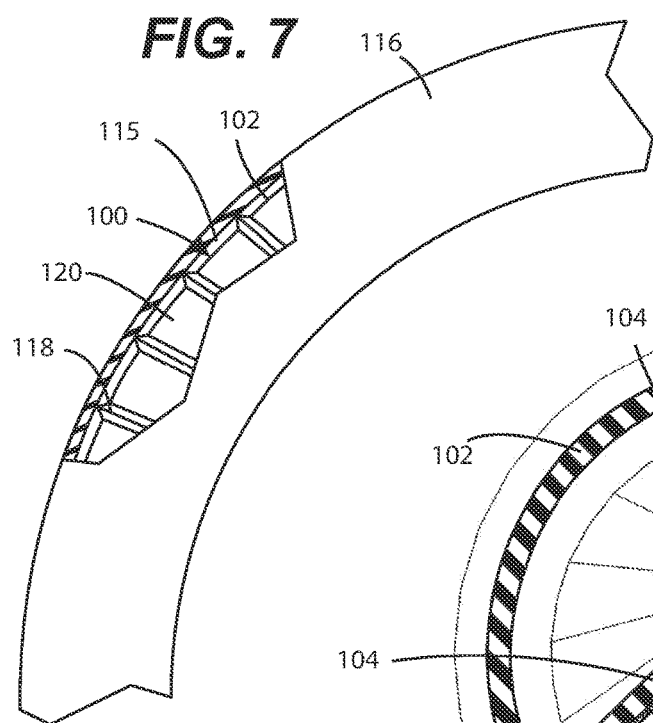
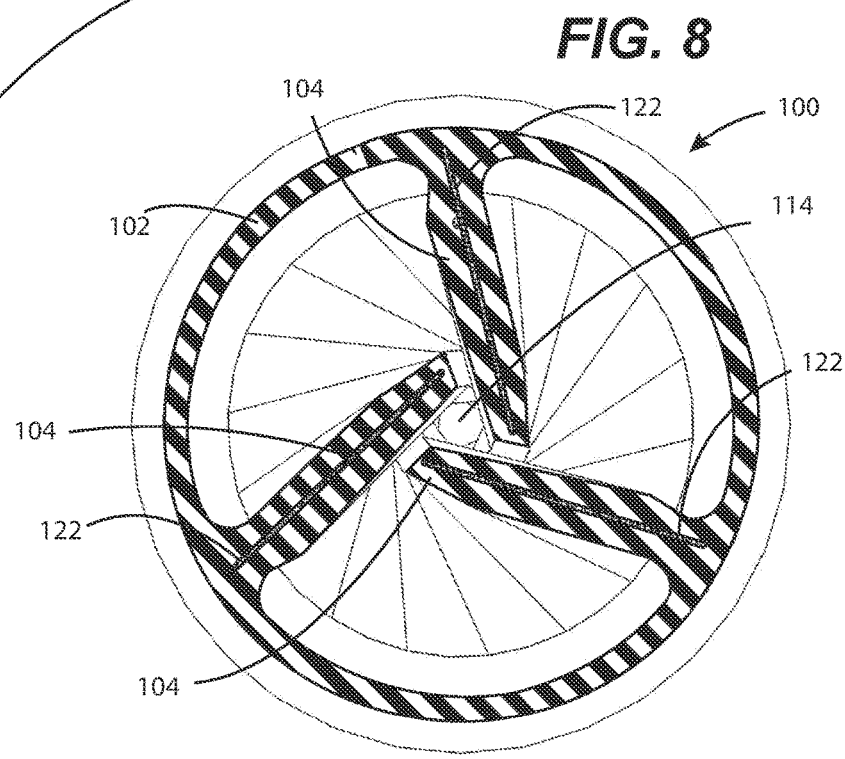

FLEXIBLE FLUID FLOW MODIFYING DEVICE

CROSS-REFERENCE TO RELATED APPLICATIONS

This continuation patent application claims priority from co-pending U.S. Non-Provisional patent application having Ser. No. 17/832,625, filed 4 Jun. 2022, entitled "FLEXIBLE FLUID FLOW MODIFYING DEVICE," which claims priority as a continuation patent application from U.S. Non-Provisional Patent Application having Ser. No. 17/569,365, filed 5 Jan. 2022, entitled "FLEXIBLE FLUID FLOW MODIFYING DEVICE", now U.S. Pat. No. 11,378,110, where these applications have a common applicant herewith and being incorporated herein in their entirety by reference.

FIELD OF THE DISCLOSURE

The disclosures made herein relate generally to structural devices used for transmission of flowable materials and, more particularly, to systems, devices, apparatuses and methods adapted for modifying fluid flow attributes of flowable fluid material within a fluid flow conduit such as a pipe, tube, hose or the like.

BACKGROUND

The practice of flowing liquid (i.e., a type of flowable fluid material) through a fluid flow conduit is well known. Such fluid flow can be required for any number of applications and through any number of different types of fluid flow conduits. In the simplest of applications, fluid flow through a fluid flow conduit may be for the sole purpose of fluid transmission from a source of the fluid to a delivery device at a desired delivery location. To this end, it is well known that fluid flow conduits can include straight and curved (e.g., bent) segments to facilitate routing of the fluid from the source to the delivery location.

A flexible fluid flow conduit is a particular form of a fluid flow conduit. Flexibility enables the flexible fluid flow conduit to include one or more curved segments that are selectively or incidentally formed by (temporarily or permanently bending (e.g., manually or mechanically) all or a portion of the flexible fluid flow conduit. Examples of flexible fluid flow conduit include, but are not limited to, hoses and tubing that are made from and/or in a manner that permits all of a portion of the fluid flow conduit to bend or be bent. A hose such as that used to flow water that is made from rubber, an elastomer, a resilient polymeric material or the like is a prime example of a flexible fluid flow conduit.

Although flexible fluid flow conduits have exceptional utility resulting from their bendability, bends in fluid flow conduits (similarly to bends in rigid fluid flow lines) are well known to create fluid flow losses. Bends inherently require flowing fluid to change direction which amplifies fluid interaction with the interior surface of the fluid flow conduit. This amplified interaction correspondingly increases frictional losses between the flowing fluid and the interior surface of the fluid flow conduit. These frictional losses cause the flow velocity of the bulk fluid flowing through the fluid flow conduit to decrease, thereby resulting in a corresponding increase in backpressure within the fluid flow conduit.

Laminar flow results from frictional between the interior surface of a fluid flow conduit and a generally straight flowing fluid. As shown in FIG. 1, conventional (i.e., non-modified/straight flowing) flow of liquid 5 (i.e., a flowable material) within a flow passage 10 of a fluid flow conduit 15 has a flow profile characterized by laminar flow effect (i.e., laminar flow 20). The laminar flow effect is characterized by a parabolic flow profile resulting from a laminar boundary layer along an interior surface defining the flow passage 10 of the fluid flow conduit 15. Liquid 5 at the surface of the flow passage 10 exhibits considerable friction and zero flow velocity, thereby reducing velocity of the liquid 5 even at a considerable distance from the surface of the flow passage 10. In association with this reduced velocity, the laminar flow effect is known to increase backpressure within a fluid flow conduit and result in head loss and heating of a fluid flowing therethrough.

Therefore, a device that can be used with flexible fluid flow conduits to overcome adverse flow considerations arising from one or more bends in such flexible fluid flow conduits would be beneficial, desirable and useful.

SUMMARY OF THE DISCLOSURE

Embodiments of the disclosures made herein are directed to a device particularly useful with flexible fluid flow conduits. Such devices are adapted for mitigating adverse flow considerations arising from one or more bends in a fluid flow conduit. These adverse flow considerations are generally characterized as enhanced laminar flow and associated increased backpressure arising from reduced flow velocity caused by the one or more bends. Beneficially, a fluid flow modifying device in accordance with one or more embodiments of the disclosures made herein enables flow of flowable material (e.g., a liquid) within a flow passage of a fluid flow conduit to have a rotational flow profile. Such a rotational flow profile advantageously reduces frictional losses associated with laminar flow and with directional change of fluid flow.

In one or more embodiment, a fluid flow modifying device comprises a tubular body made from a respective resilient polymeric material and a plurality of flow diverters each made from a respective resilient polymeric material. Each of the respective resilient polymeric material have a resiliency enabling flexibility of the respective portion of the fluid flow modifying device. Each of the flow diverters is attached at an outer edge portion thereof to an inner surface of the tubular body and extending outwardly therefrom. All of the flow diverters extend at least partially along an entire length of the tubular body in a helical manner. Each flow is detached from each other flow diverter over at least a portion of a length thereof.

In one or more embodiments, a one-piece fluid flow modifying device comprises a plurality of flow modifying device elements each made from at least one resilient polymeric material. The at least one resilient polymeric material has a resiliency enabling flexibility of the respective portion of the fluid flow modifying device. The plurality of flow modifying device elements comprises a tubular body and a plurality of flow diverters. The tubular body has an outer surface and an inner surface. The plurality of flow diverters are each attached at an outer edge portion thereof to the inner surface and extending outwardly therefrom. All of the flow diverters extend at least partially along an entire length of the tubular body in a helical manner. Each flow diverter is detached from each other flow diverter over at least a portion of a length thereof.

In one or more embodiments, a fluid flow modifying device comprises a plurality of flow modifying device elements each made from at least one resilient polymeric material. The at least one resilient polymeric material has a resiliency enabling flexibility of the respective portion of the fluid flow modifying device. All of the flow modifying device elements are unitarily formed with each other as a one-piece body. The plurality of flow modifying device elements comprises a tubular body and a plurality of helical vanes. The tubular body has an outer surface and an inner surface. The plurality of helical vanes each attached at an outer edge portion thereof to the inner surface and extend outwardly therefrom. All of the helical vanes extend along an entire length of the tubular body. Each helical vane is detached from each other helical vane over an entire length thereof along an entire length of the tubular body. Each of the helical vanes has an identical cross-sectional profile as each other helical vane, extends from the inner surface in a skewed manner and has a width greater than an inner radius of the tubular body such that the inner edge portion of each helical vane overlaps the inner edge portion of each adjacent one of the helical vanes. The tubular body includes a plurality of spaced apart protrusions extending outwardly from the outer surface thereof and each of the protrusions is in the form of a ring extending at least partially around a circumference of the tubular body.

In one or more embodiments, each flow diverter is detached from each other flow diverter over an entire length thereof.

In one or more embodiments, each flow diverter is in implemented in the form of a helical vane.

In one or more embodiments, the tubular body is made from a different resilient polymeric material than the flow diverters.

In one or more embodiments, the tubular body is made from a resilient polymeric material having a lower durometer than the resilient polymeric material of the flow diverters.

In one or more embodiments, the tubular body and the flow diverters are unitarily formed with each other as a one-piece body.

In one or more embodiments, each of the flow diverters has an identical cross-sectional profile as each other flow diverter, extends from the inner surface of the tubular body in a skewed manner and has a width greater than an inner radius of the tubular body such that the inner edge portion of the flow diverters overlap an adjacent one of the flow diverters.

In one or more embodiments, the tubular body and the flow diverters are unitarily formed with each other as a one-piece body.

In one or more embodiments, the tubular body includes a plurality of spaced apart protrusions each extending outwardly from the outer surface thereof.

In one or more embodiments, each of the protrusions is in the form of a ring extending at least partially around a circumference of the tubular body.

These and other objects, embodiments, advantages and/or distinctions of the disclosures made herein will become readily apparent upon further review of the following specification, associated drawings and appended claims.

BRIEF DESCRIPTION OF THE DRAWINGS

FIG. 6 is a fragmentary cross-sectional view taken along the line 6-6 in FIG. 3, showing the fluid flow modifying device engaged within a central passage of a prior art fluid flow conduit.

FIG. 7 is a fragmentary, cutaway plan view showing a prior art flexible fluid flow conduit in a bent configuration with the fluid flow modifying device shown in FIG. 3 engaged within a central passage thereof.

FIG. 8 is a cross-sectional view taken along the line 8-8 in FIG. 3, showing the fluid flow modifying device engaged within a central passage of a prior art fluid flow conduit.

DETAILED DESCRIPTION

Figure 1:
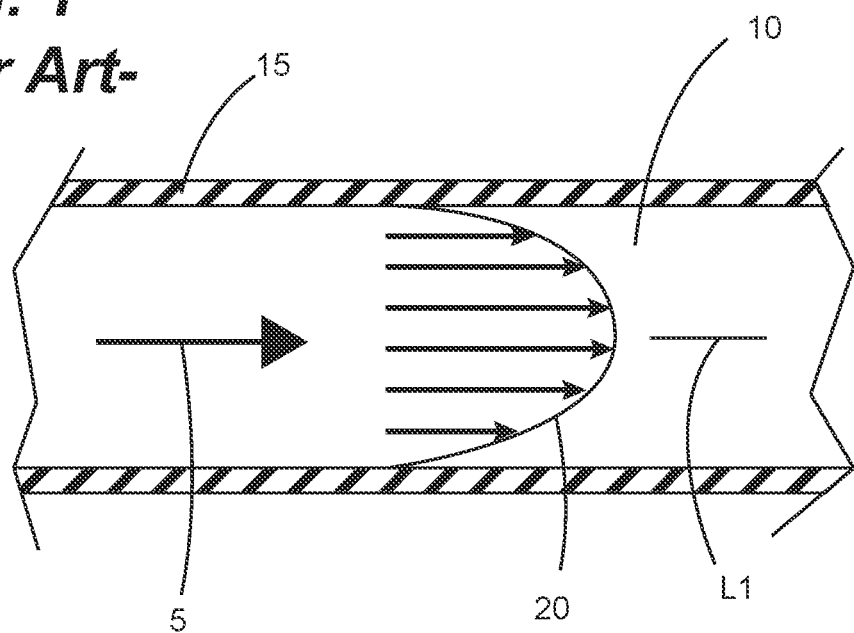
FIG. 1 is a diagrammatic view showing laminar flow effect within a material flow conduit.

Embodiments of the disclosures made herein are directed to fluid flow modifying devices. Such fluid flow modifying devices are preferably passive devices that have no parts that actively (i.e., non-passively) move during operation. Rather, these fluid flow modifying devices operate passively on the basis of an existing flow velocity of a pumping system within a fluid flow apparatus comprising the pumping system. Accordingly, when there is flow velocity through the fluid flow apparatus, a fluid flow modifying device in accordance with the disclosures made herein is preferably always operational.

Advantageously, fluid flow modifying devices in accordance with the disclosures made herein are adapted for use within fluid flow conduits that permanently or temporarily have a curved (e.g., bend or bent section) at a location upstream of, downstream of or at the fluid flow modifying device. To this end, fluid flow modifying devices in accordance with the disclosures made herein are made from components and materials enabling the fluid flow modifying device to be fully or at least partially flexible for enabling insertion of the fluid flow modifying device into a flexible fluid flow conduit such that the fluid flow modifying device can bend in conjunction with the flexible fluid flow conduit and/or enabling the fluid flow modifying device to be inserted into a bent segment of a rigid fluid flow conduit. In preferred embodiments, utilization of a fluid flow modifying device as disclosed herein can include the fluid flow modifying device being a discrete article that is engaged within a central passage of an existing flexible fluid flow conduit (e.g., a hose, tube, pipe of the like) or can include the fluid flow modifying device being an integral segment of a flexible fluid flow conduit.

As discussed above in reference to FIG. 1, conventional flow of liquid 5 within the flow passage 10 of the fluid flow conduit 15 has a flow profile characterized by laminar flow effect (i.e., laminar flow 20). However, fluid flow modifying devices in accordance with the disclosures made herein (e.g., the fluid flow modifying device 100 shown in FIGS. 2-8) are advantageously configured in a manner that causes fluid flow to be transformed from a flow profile characterized by laminar flow effect to a flow profile being characterized by rotational flow effect 25. The rotational flow effect 25 is the result of rotational movement of the fluid 5 about the longitudinal axis L1 of the fluid flow conduit 15 as generated by fluid flow modifying devices in accordance with the disclosures made herein.

Figure 2:
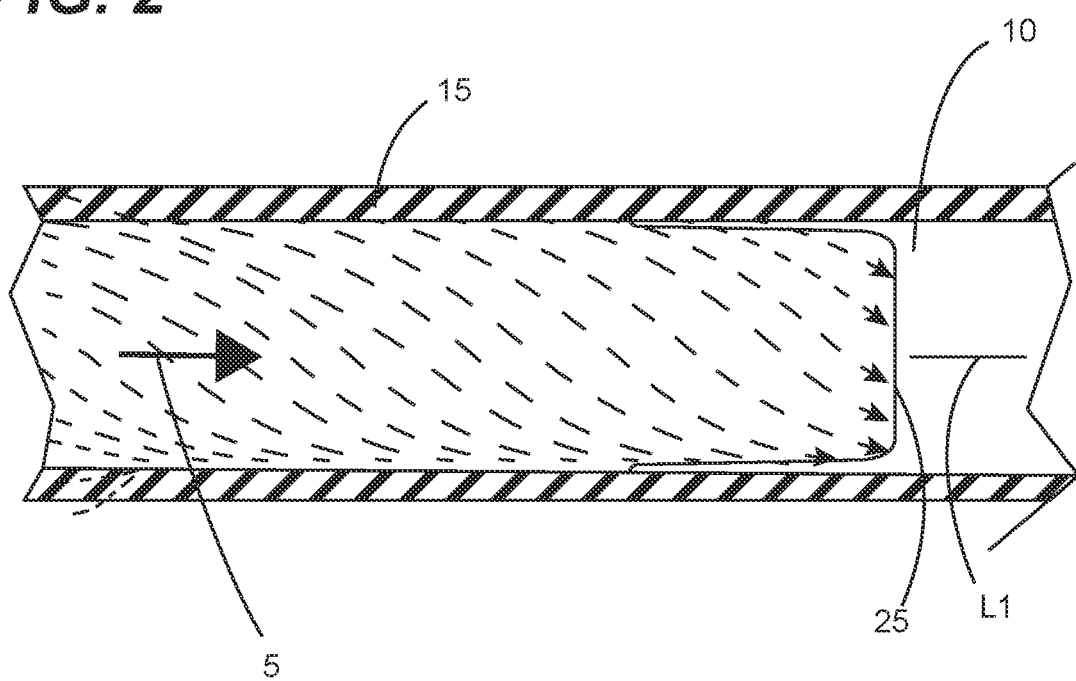
FIG. 2 is a diagrammatic view showing conversion from a laminar flow effect to rotation flow effect by a material flow modifying device configured in accordance with one or more embodiments of the disclosures made herein.
Figure 3:
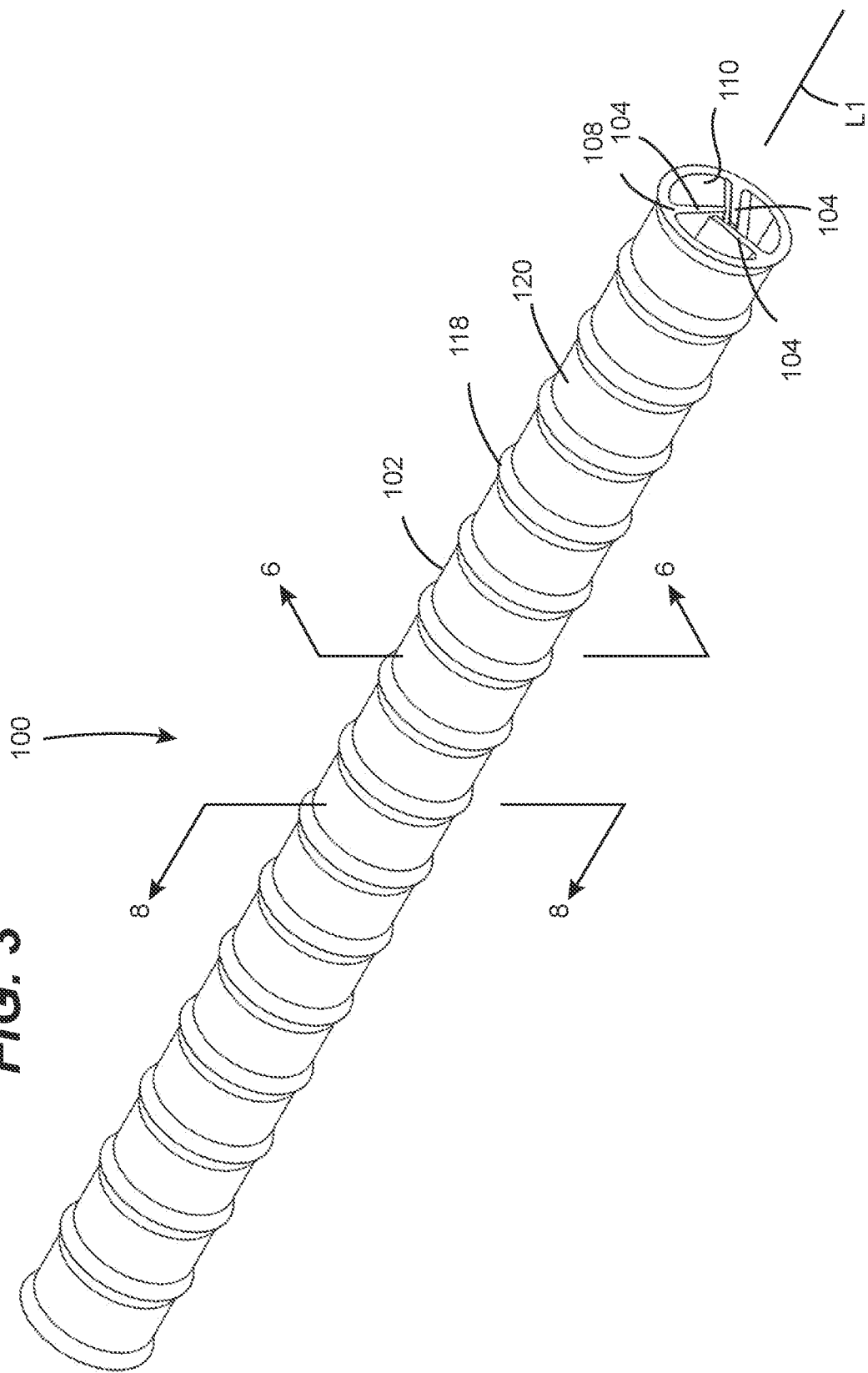
FIG. 3 is a first perspective view of a fluid flow modifying device configured in accordance with one or more embodiments of the disclosures made herein.

As a person of ordinary skill in the art will understand, rotational flow provides greater average flow velocity and volumetric flow than laminar flow for a given fluid flow distance within a particular fluid flow conduit (e.g., as depicted in FIGS. 1 and 2). Additionally, rotational flow mitigates adverse interaction between the surface of the fluid flow conduit and materials flowing therethrough (e.g., solids within a fluid). These advantageous aspects of rotational flow arise from the rotational flow profile reducing frictional losses between the flowing fluid and the interior surface of the fluid flow conduit. This reduction in frictional losses results in the flow velocity of the bulk fluid flowing through the fluid flow conduit being increased in comparison to laminar flow, thereby resulting in a corresponding reduction in backpressure within the fluid flow conduit downstream of the fluid flow modifying device. In this regard, fluid flow modifying devices in accordance with the disclosures made herein beneficially provide rotational flow that promotes flow of fluids through fluid flow conduits having one or more bends therein in a more effective and efficient manner than in conventional fluid flow conduit implementations.

Referring now to FIGS. 3-7, specific aspects of a fluid flow modifying device in accordance with one or more embodiments of the disclosures made herein (i.e., the fluid flow modifying device 100) are discussed. The fluid flow modifying device 100 includes a tubular body 102 and a plurality of flow diverters 104. The tubular body 102 (e.g., a cylindrical portion) has a central passage 106 extending along a centerline longitudinal axis L1 of the tubular body 102. The central passage 106 defines an interior space of the tubular body 102 preferably having a generally round cross-sectional (cylindrical) shape.

The flow diverters 104 are located within the central passage 106 of the tubular body 102. Each of the flow diverters 104 is attached at an outer edge portion 108 thereof to an inner surface 110 of the tubular body 102 and extends outwardly therefrom. In one or more other embodiments, the flow diverters 104 extend at least partially along an entire length of the tubular body 102 relative to one or both ends of the tubular body 102. As shown, the flow diverters 104 may extend along an entire length of the tubular body 102 and extend longitudinally in a helical manner (e.g., a uniform diameter spiral shape). Each flow diverter 104 may exhibit at least one full rotation about the centerline longitudinal axis L1 and preferably at least about 600 degrees of rotation about the centerline longitudinal axis L1. In at least one embodiment, each of the flow diverters 104 may be in the form of a helical vane (i.e., a helix structure having a cross-sectional profile resembling that of a vane). Preferably, the tubular body 102 and the flow diverters 104 are jointly configured such that functionality of the fluid flow modifying device 100 is independent of flow direction—i.e., supports bi-directional flow.

Figure 5:
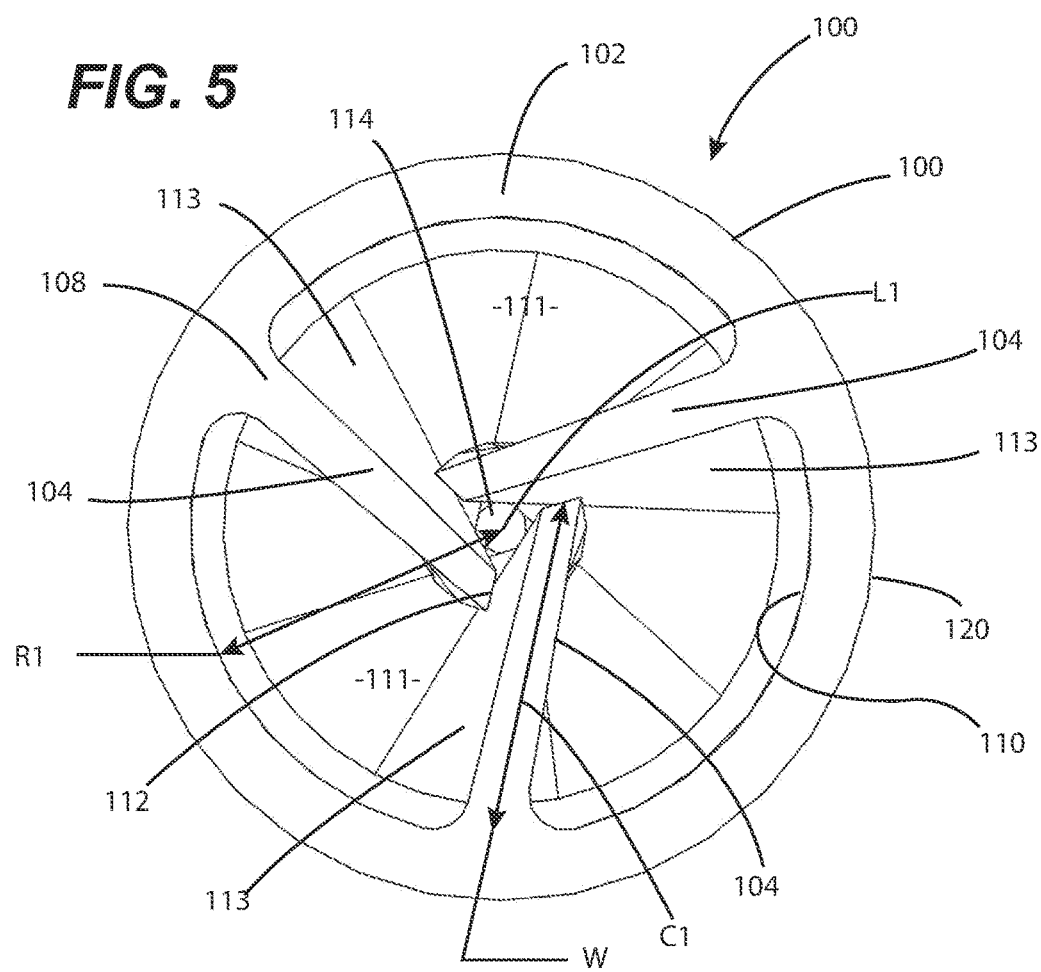
FIG. 5 is an end view of the fluid flow modifying device shown in FIG. 3.

As best shown in FIGS. 5 and 6, in preferred embodiments, each flow diverter 104 is detached from each other flow diverter 104 over its entire length. Put differently, in an as-fabricated state, each flow diverter 104 is in a free-standing state relative to each other flow diverter 104. Alternatively, in other embodiments, each flow diverter 104 can be detached from each other flow diverter 104 over less than its entire length. To this end, an inner edge portion 112 of each flow diverter 104 is detached from each other flow diverter 104, thereby allowing the flow diverters 104 to move (e.g., bend, displace and/or slide) freely relative to each other as the tubular body 102 is bent (e.g., up to 60 degrees or more) and as fluid flows through the central passage 106 of the tubular body 102.

As best shown in FIG. 5, such detached arrangement may provide for each flow diverter 104 to have an identical cross-sectional profile as each other flow diverter 104, to extend from the inner surface 110 in a skewed manner (i.e., a centerline axis (C1) of each flow diverter 104 not extending through the longitudinal axis L1 of the tubular body 102) and to have a width W greater than an inner radius R1 of the tubular body 102 such that the inner edge portion 112 of each flow diverter 104 extends past the inner edge portion 112 of each adjacent flow diverter 104. The aforementioned detached arrangement results in the inner edge portions 112 of the flows diverters 104 jointly creating a central aperture 114 extending along the longitudinal axis L1 of the tubular body 102. Each flow diverter 104 can have a fillet at its outer edge portion 108 between fluid impingement surfaces 113 of each flow diverter 104 and the inner surface 110 (rear surface not shown is impingement surface for opposite flow direction).

Figure 4:
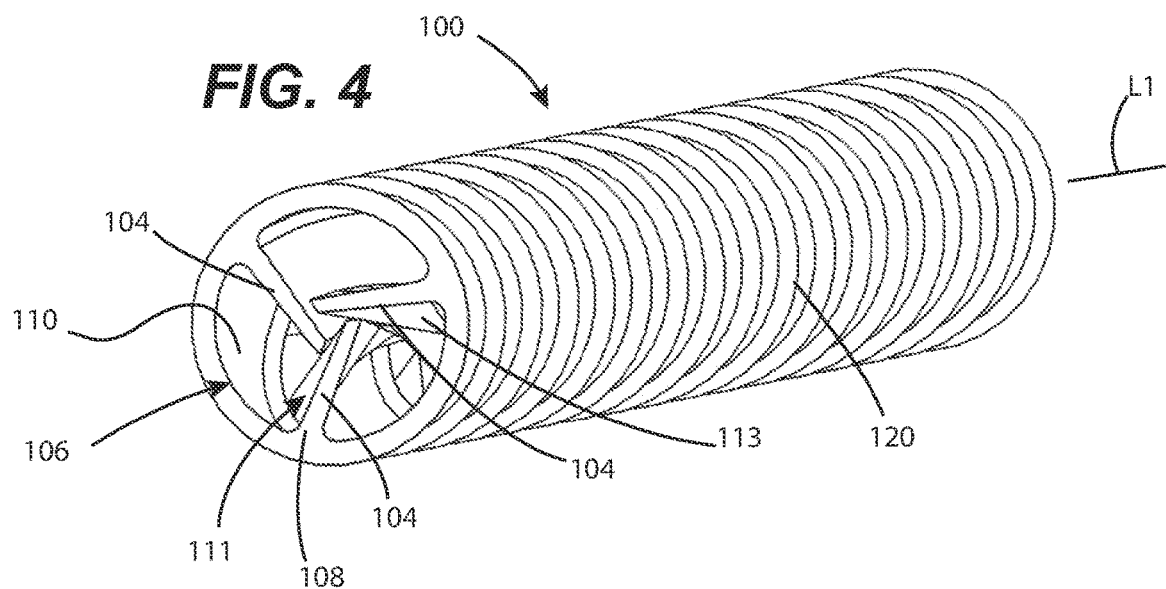
FIG. 4 is a second perspective view of the fluid flow modifying device shown in FIG. 3.

As best shown in FIGS. 4 and 5, helical flow passages 111 are formed between adjacent pairs of the flow diverters 104 and an intersecting (i.e., adjacent) portion of the tubular body 102. In use, each helical flow passage 111 creates a respective fluid flow stream as fluid flows therethrough. The central aperture 114 may transition from a static (i.e., as-manufactured) size and shape (shown) to an enlarged size and different shape due to flexure (i.e., bending) when force is exerted on the fluid impingement surface 113 of the flow diverters 102 as fluid flowing through the helical flow passages 111. At a terminal end of the fluid flow modifying device 100, all of the fluid flow streams from the helical flow passages 111 merge together within a central passage 115 of a fluid flow conduit 116 within which the fluid flow modifying device 100 is engaged. The merged fluid flow streams jointly form a rotational fluid flow stream, which as discussed above, exhibits reduced frictional losses between the flowing fluid and an interior surface of the fluid flow conduit 116. This reduction in frictional losses result in the flow velocity of the bulk fluid flowing through the fluid flow conduit 116 be increased in comparison to laminar flow through the fluid flow conduit 116. As a result, the rotational fluid flow stream better utilizes the cross sectional flow area of the central passage 115 of the fluid flow conduit 116.

Referring now to FIGS. 6-7, the fluid flow modifying device 100 is adapted for being securely engaged within the central passage 115 of the fluid flow conduit 116. The fluid flow modifying device 100 is specifically configured to permit such bending of the fluid flow conduit 116 in a region of the fluid flow conduit 116 where the fluid flow modifying device 100 resides. To this end, in typical implementations, the fluid flow conduit may be made of materials that permit such bending and may include structural aspects that permit such bending—i.e., resilient polymeric material.

The tubular body 102 may include a plurality of spaced apart protrusions 118 extending outwardly from an outer surface 120 of the tubular body 102. As shown, the protrusions 118 are in the form of rings extending at least partially around circumference of the tubular body 102. In other embodiments, the protrusions 118 may be in the form of discrete protrusions such as raised semi-spheres, ridges or the like. The protrusions 118 serve two primary functions. A first of these functions is to facilitate insertion of the fluid flow modifying device 100 into the central passage 115 of the fluid flow conduit 116 and securement therein by reducing dynamic insertion friction while increasing static friction when the fluid flow modifying device 100 has pressurized fluid flowing therethrough. A second of these functions is to promote bendability of the fluid flow conduit 116 in a region of the fluid flow conduit 116 where the fluid flow modifying device 100 resides. Promoting bendability is achieved by decoupling the outer surface 120 of the tubular body 102 from the surface of the central passage 115 of the fluid flow conduit 116—e.g., the outer surface of the tubular body 102 is spaced away from the surface of the central passage 115 of the fluid flow conduit 116 by the protrusions 118, thereby reducing contact and material binding during bending.

In some preferred embodiments, the tubular body 102 and the flow diverters 104 are flow modifying device elements each made from a respective resilient polymeric material in the form of a unitarily formed (i.e., one-piece) fluid flow modifying device. One objective of material selection and dimensions for the tubular body 102 is enabling suitable bending performance relative to that of an associated fluid flow conduit (e.g., the fluid flow conduit 116) within which the fluid flow modifying device 100 resides. For example, it is desirable for the fluid flow modifying device 100 to be bendable up to 60 degrees or more. Another objective of material selection and dimensions for the flow diverters 104, in addition to enabling the aforementioned bendability, is enabling controlled displacement of the flow diverters 104 for an intended flow range of the fluid flow modifying device 100—e.g., 0-600 gallons per minute (GPM). This controlled displacement enables the flow diverters 104 to bend as needed (i.e., in a cantilevered manner along the width W) to accommodate increasing flow rates while still providing for rotational flow. Controlled displacement of the flow diverters (i.e., flexing) over an intended flow range is a highly beneficial aspect of fluid flow modifying devices in accordance with embodiments of the disclosure made herein as it provides for automatic angular adjustment of the fluid impingement surface of the flow diverters as a function of flow rate.

Fluid flow modifying devices in accordance with the inventive disclosures made herein may be implemented as a multi-device assembly. Such a multi-device assembly may include two or more individual fluid flow modifying device arranged and, optionally, attached in a sequential (i.e., end-to-end) manner. Each fluid flow device in such a sequential arrangement may be of identical configuration. Optionally, one or more fluid flow devices arranged in a sequential arrangement may be of a different configuration that one or more other fluid flow devices arranged in the sequential arrangement. For example, an upstream one of the fluid flow devices may have a flow diverter configuration different than that of a downstream one of the fluid flow devices (e.g., different helix pitch and/or different durometer polymeric material). Still further, such a sequential arrangement may be implemented for creating an assembly of a required total length longer than can be fabricated in the form of a single fluid flow device.

The tubular body 102 may be made from a different resilient polymeric material than the flow diverters 104 to optimized respective functionalities of these different flow modifying device elements. For example, the tubular body 102 may be made from a resilient polymeric material having a lower durometer (i.e., more flexible) than the resilient polymeric material of the flow diverters 104 or may be made from a resilient polymeric material having a higher durometer (i.e., less flexible) than the resilient polymeric material of the flow diverters 104. Examples of resilient polymeric material from which the flow modifying device elements include, but are not limited to, elastomer, fluoroelastomer, styrene rubber, ethylene propylene diene terpolymer (EPDM), synthetic (e.g., butyl) rubber.

Fluid flow modifying devices as disclosed herein may be fabricated in accordance with any suitable technique enabling disclosed functionality thereof. In preferred embodiments, suitable techniques will be selected based upon an ability to unitarily form flow modifying device elements as a one-piece article from one or more resilient polymeric materials. In other embodiments, all or some of the flow modifying device elements may be formed as discrete articles and then combined or otherwise integrated to form a finished fluid flow modifying device. One suitable preferred fabrication technique involves separable mold segments that jointly form a mold having a cavity therein providing a negative impression of a fluid flow modifying device. One or more curable materials are deposited into the cavity for forming a fluid flow modifying device. The mold allows for curing of the resilient polymeric material(s) within the cavity to form a fluid flow modifying device. Applicant respectfully submits that, in view of the disclosures made herein, a skilled person will devise and/or identify other suitable fabrication techniques.

In some embodiments, as generally shown in FIG. 8, the flow diverters 104 may each include embedded strengthening elements 122. Preferably, the flow diverters 104 each have a plurality of embedded strengthening elements 122 that are spaced apart from each other along a length of the respective one of the flow diverters 104. Preferably, the embedded strengthening elements 122 each have a longitudinal axis thereof extending along the width W of a respective one of the flow diverters 104. Thus, as shown, each one of the embedded strengthening elements 122 may extend within a respective one of the flow diverters 104 from adjacent the tubular body 102 to adjacent the inner edge portion 112 of the respective one of the flow diverters 104. Examples of the embedded strengthening elements 122 include, but are not limited to, strands, fibers, fabrics and the like made from materials such as, for example fiberglass, carbon fiber, Kevlar and the like. Preferably, selected resilient polymeric material(s) from which the flow diverters 104 are made preferably bond to such embedded strengthening elements 122. Integration and implementation of the embedded strengthening elements 122 serve to promote longevity of flexure, strength and durability of the flow diverters 104 for enabling them to flex as needed while still returning to an original-formed shape. This flexure functionality is important because the fluid flows through a flow modifying device may be omni-directional thereby causing bi-directional deformation of the flow diverters 104 and can be at flow rates that cause notable deformation of the flow diverters 104 even if in only one flow direction.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A fluid flow modifying device, comprising:
a plurality of flexible flow diverters each extending along a centerline longitudinal reference axis relative to each other, wherein each of the flexible flow diverters extends helically about and along the centerline longitudinal reference axis, wherein each flexible flow diverter is detached from each other flexible flow diverter over at least a portion of a length thereof, and wherein an inner edge portion of each of the flexible flow diverters overlaps the inner edge portion of each adjacent one of the flexible flow diverters.

2. A fluid flow modifying device, comprising:
a plurality of flexible flow diverters each extending along a centerline longitudinal reference axis relative to each other, wherein each of the flexible flow diverters extends helically about and along the centerline longitudinal reference axis, wherein each flexible flow diverter is detached from each other flexible flow diverter over at least a portion of a length thereof, wherein an inner edge portion of each of the flexible flow diverters overlaps the inner edge portion of each adjacent one of the flexible flow diverters, and wherein the inner edge portion of each of the flexible flow diverters is detached from the inner edge portion of each other one of the flow diverter over at entire length thereof.

3. A fluid flow modifying device, comprising:
a plurality of flexible flow diverters each extending along a centerline longitudinal reference axis relative to each other, wherein each of the flexible flow diverters extends helically about and along the centerline longitudinal reference axis, wherein each flexible flow diverter is detached from each other flexible flow diverter over at least a portion of a length thereof, wherein an inner edge portion of each of the flexible flow diverters overlaps the inner edge portion of each adjacent one of the flexible flow diverters, and wherein an inner edge portion of each of the flow diverters overlaps an inner edge portion of each other one of the flow diverters.

4. The fluid flow modifying device of claim 3 wherein the inner edge portion of each of the flexible flow diverters is detached from the inner edge portion of each other one of the flow diverter over at entire length thereof.

5. A fluid flow modifying device, comprising:
a plurality of flexible flow diverters each extending along a centerline longitudinal reference axis relative to each other, wherein each of the flexible flow diverters extends helically about and along the centerline longitudinal reference axis, wherein each flexible flow diverter is detached from each other flexible flow diverter over at least a portion of a length thereof, wherein an inner edge portion of each of the flexible flow diverters overlaps the inner edge portion of each adjacent one of the flexible flow diverters, and wherein an inner edge portion of each of the flow diverters is detached from the inner edge portion of each other one of the flow diverters over at least a portion of a length thereof.

6. The fluid flow modifying device of claim 5 wherein the inner edge portion of each of the flexible flow diverters is detached from the inner edge portion of each other one of the flow diverter over at entire length thereof.

7. The fluid flow modifying device of claim 5 wherein an inner edge portion of each of the flow diverters overlaps an inner edge portion of each other one of the flow diverters.

8. The fluid flow modifying device of claim 7 wherein the inner edge portion of each of the flexible flow diverters is detached from the inner edge portion of each other one of the flow diverter over at entire length thereof.

9. A fluid flow modifying device, comprising:
at least two flow diverters that are each flexible and elongated; and
a support body having a central space, wherein each of the flow diverters has an outer edge portion thereof engaged with the support body, wherein each of the flow diverters extends into the central space such that an inner edge portion of each of the flow diverters is adjacent to an inner edge portion of each other one of the flow diverters, wherein each of the flow diverters extends helically about and along a centerline longitudinal reference axis of the support body, and wherein the inner edge portion of each of the flow diverters is detached from the inner edge portion of each other one of the flow diverters over at least a portion of a length thereof.

10. The fluid flow modifying device of claim 9 wherein:
the inner edge portion of each of the flow diverters is detached from the inner edge portion of each other one of the flow diverter over at entire length thereof and
a width of each of the flow diverters is greater than an inner radius of the central space such that an inner edge portion of each of the flow diverters overlaps an inner edge portion of each other one of the flow diverters.

11. The fluid flow modifying device of claim 9 wherein:
each of the flow diverters is made from a first material;
the support body is made from a second material different from the first material; and
the first material is a resilient polymeric material.

12. The fluid flow modifying device of claim 11 wherein:
the second material is a resilient polymeric material; and
the second material has a lower durometer than the first material.

13. The fluid flow modifying device of claim 12 wherein the support body and the flow diverters are unitarily formed with each other as a one-piece body.

14. The fluid flow modifying device of claim 13 wherein the inner edge portion of each of the flow diverters is detached from the inner edge portion of each other one of the flow diverter over at entire length thereof.

15. The fluid flow modifying device of claim 9 wherein each of the flow diverters:
has an identical cross-sectional profile as each other one of the flow diverters; and
extends from the support body in a skewed manner.

16. The fluid flow modifying device of claim 15 wherein the inner edge portion of each of the flow diverters is detached from and spaced away from the inner edge portion of each other one of the flow diverter over at entire length thereof.

17. The fluid flow modifying device of claim 16 wherein:
the tubular body and the flow diverters are each made from a respective is made resilient polymeric material; and
the tubular body is made from a different resilient polymeric material than the flow diverters.

18. The fluid flow modifying device of claim 15 wherein:
the tubular body and the flow diverters are each made from a respective is made resilient polymeric material; and
the tubular body is made from a different resilient polymeric material than the flow diverters.

19. The fluid flow modifying device of claim 18 wherein the tubular body is made from a resilient polymeric material having a lower durometer than the resilient polymeric material of the flow diverters.

20. The fluid flow modifying device of claim 19 wherein the tubular body and the flow diverters are unitarily formed with each other as a one-piece body.

21. The fluid flow modifying device of claim 20 wherein the inner edge portion of each of the flow diverters is detached from the inner edge portion of each other one of the flow diverter over at entire length thereof.

22. The fluid flow modifying device of claim 9 wherein the support body is a tubular body having a plurality of spaced apart protrusions extending outwardly from the outer surface thereof.

23. The fluid flow modifying device of claim 22 wherein each of the protrusions is in the form of a ring extending at least partially around a circumference of the tubular body.

24. The fluid flow modifying device of claim 22 wherein:
the inner edge portion of each of the flow diverters is detached from the inner edge portion of each other one of the flow diverter over at entire length thereof; and
the tubular body and the flow diverters are unitarily formed with each other as a one-piece body.

25. The fluid flow modifying device of claim 24 wherein each of the flow diverters:
has an identical cross-sectional profile as each other one of the flow diverters; and
extends from the support body in a skewed manner.

26. The fluid flow modifying device of claim 24 wherein:
the tubular body and the flow diverters are each made from a respective is made resilient polymeric material;
the tubular body is made from a different resilient polymeric material than the flow diverters;
the tubular body and the flow diverters are unitarily formed with each other as a one-piece body; and
the tubular body is made from a resilient polymeric material having a lower durometer than the resilient polymeric material of the flow diverters.

27. The fluid flow modifying device of claim 22 wherein each of the flow diverters:
has an identical cross-sectional profile as each other one of the flow diverters;
extends from the support body in a skewed manner; and
a width of each of the flow diverters is greater than an inner radius of the central space such that an inner edge portion of each of the flow diverters overlaps an inner edge portion of each other one of the flow diverters.

28. The fluid flow modifying device of claim 27 wherein the inner edge portion of each of the flow diverters is detached from the inner edge portion of each other one of the flow diverter over at entire length thereof.

* * * * *